United States Patent [19]

Stumphauzer et al.

[11] Patent Number: 5,192,513
[45] Date of Patent: Mar. 9, 1993

[54] HIGH SPEED PROCESS AND APPARATUS FOR CARBONATING WATER

[75] Inventors: William C. Stumphauzer, 44550 Stang Rd., Elyria, Ohio 44035; Hugh F. Groth, Richfield; L. Scot Duncan, Independence, both of Ohio

[73] Assignee: William C. Stumphauzer, Elyria, Ohio

[21] Appl. No.: 736,628

[22] Filed: Jul. 26, 1991

[51] Int. Cl.⁵ ............................. A23L 2/26; B01J 8/00
[52] U.S. Cl. ................................. 422/305; 422/239; 422/277; 222/129.1; 99/323.1; 261/DIG. 7
[58] Field of Search ............... 422/239, 277, 278, 305; 220/206, 248, 315, 316, 625; 222/129.1; 261/122, DIG. 7; 99/323.1

[56] References Cited

U.S. PATENT DOCUMENTS

| | | | |
|---|---|---|---|
| 2,826,401 | 3/1958 | Peters | 261/DIG. 7 |
| 3,583,601 | 6/1971 | Ayers | 222/129.1 |
| 3,731,845 | 5/1973 | Booth | 222/129.1 |
| 3,752,452 | 8/1973 | Iannelli | 261/DIG. 7 |
| 3,851,797 | 12/1974 | Jacobs | 261/DIG. 7 |
| 4,040,342 | 8/1977 | Austin et al. | 261/DIG. 7 |
| 4,139,123 | 2/1979 | Castillo | 222/129.1 |
| 4,140,245 | 2/1979 | Castillo | 222/129.1 |
| 4,216,879 | 8/1980 | McMillin | 222/1 |
| 4,347,783 | 9/1982 | Ogden | 99/323.1 |
| 4,424,915 | 1/1984 | Horn | 220/206 |
| 4,482,509 | 11/1984 | Ianelli | 261/DIG. 7 |
| 4,493,441 | 1/1985 | Sedam et al. | 222/129.1 |
| 4,632,275 | 12/1986 | Parks | 222/129.1 |
| 4,636,337 | 1/1987 | Gupta et al. | 261/122 |
| 4,660,741 | 4/1987 | Kirschner et al. | 222/1 |
| 4,688,701 | 8/1987 | Sedam | 222/129.1 |
| 4,719,056 | 1/1988 | Scott | 261/DIG. 7 |
| 4,742,939 | 5/1988 | Galockin | 222/129.1 |
| 4,745,853 | 5/1988 | Hoover | 261/DIG. 7 |
| 4,940,164 | 7/1990 | Hancock et al. | 261/DIG. 7 |
| 5,021,219 | 6/1991 | Rudick et al. | 99/323.1 |
| 5,102,627 | 4/1992 | Plester | 422/112 |

FOREIGN PATENT DOCUMENTS 412849 7/1934 United Kingdom .

Primary Examiner—Robert J. Warden
Assistant Examiner—Theresa A. Trembley
Attorney, Agent, or Firm—Paul E. Milliken

[57] ABSTRACT

A process and apparatus for rapidly carbonating water for use in applications such as beverage mixes by producing carbon dioxide gas by chemical reaction within a first pressure vessel, transferring the carbon dioxide to a second pressure vessel where it is injected under pressure beneath the water in the second pressure vessel to carbonate the water therein while maintaining sufficient pressure to prevent dissolved carbon dioxide from coming out of solution in the water and for dispensing the carbonated water upon demand. Restrictive venting of the second pressure vessel may be used if needed, to aid in the transfer of carbon dioxide from the first to the second pressure vessel.

9 Claims, 5 Drawing Sheets

HIGH SPEED PROCESS AND APPARATUS FOR CARBONATING WATER

This invention relates to a high speed process and apparatus for rapidly carbonating water which is particularly suitable for a small post-mix beverage dispenser of the type used in homes or small offices.

BACKGROUND OF THE INVENTION

Up to the present time there have been many different types of apparatus designed for carbonating water for use in beverages. Some of these devices use a container of pressurized carbon dioxide which is injected into the water by various means within a carbonation chamber. Other devices do not use an existing supply of carbon dioxide but generate the carbon dioxide within the device as needed to carbonate each new batch of water and then transfer the carbon dioxide to a carbonation chamber with water therein.

In any batch type carbonating device it is desirable that the steps of generating the carbon dioxide and carbonating the water take place as rapidly as possible so that there is not an undue wait for carbonated water when it is needed for mixing a beverage.

If both the generation of carbon dioxide and the carbonation of the water occur at a rapid rate, this means that the entire batch process requires a minimum amount of time, thus eliminating any long waiting period whenever carbonated water is needed.

U.S. Pat. No. 4,040,342 issued to R.R. Austin et al. is an example of an earlier design of carbonating apparatus which both generates the carbon dioxide and carbonates the water in the same machine. In this device carbon generating chemicals are released by a certain mechanism into water in a carbon dioxide generator chamber and then the carbon dioxide is transferred into a carbonation chamber where it is injected into the water to be carbonated. While this device may perform the carbonation operation, it does not address the problem of of rapid carbon dioxide generation and rapid carbonation of the water.

For a home water carbonating apparatus to be acceptably convenient to a consumer, the time required to make one batch should be five minutes or less which is about the amount of time it takes to prepare a pot of coffee. The shorter the prepartion time, the better and more convenient it is to the user.

To achieve rapid reaction and generation of carbon dioxide gas and to simultaneously achieve rapid solvation of the carbon dioxide into the water, several conditions must be met. First, the surface area in sq. cm. divided by volume in cu. cm. of the carbonating powder or pellets must be a ratio of about 0.86 or more. The higher the exposed surface area is as a ratio of the carbon dioxide powder or pellet volume, the faster the reaction will be when the powder or pellets are submerged in water. The Austin et al. patent makes no provision for increasing the area of surface contact between the carbon generating compound and the water.

It is also necessary to cause a high percentage of the gas being injected into the water to dissolve into the water during the injection process. It is known that carbon dioxide solubility in water increases as pressure increases. An injection pressure of 120 psi, (8.437 kg/cm$^2$) or more causes rapid solvation of the carbon dioxide into the water. The Austin et al. patent does not specify an injection pressure, however since there is no fluid restriction shown in the dispense line of the Austin et al. patent, it would seem to indicate that the tank pressure is not above 50 psi (3.516 kg/cm$^2$) otherwise a fluid restricter would be needed to prevent the carbonated water from losing carbon dioxide gas due to a rapid pressure drop while dispensing carbonated water from the tank.

It is known that for a given gas which is soluble or partially soluble in a given liquid, (i.e., carbon dioxide and water) the rate of solvation of the gas into the liquid increases as the interfacial area between a given volume of the liquid and the gas is increased per given unit of time. For example, far more oxygen dissolves per unit of time into water cascading over a turbulent waterfall than dissolves into the equivalent volume of still water in a pond or lake in the same length of time.

In addition to that shown in Austin et al., various other methods of carbonating water are know in the prior art. In one such method carbon dioxide gas is injected into the water to be carbonated at a low level forming bubbles which float up through the water to the surface so that carbon dioxide in the bubbles becomes absorbed into the water. This method is often used in small carbonating apparatus for home use where only a limited number of drinks are mixed. Examples of this injection method of carbonation can be seen in UK Patent Specification No. 412,849 (Schwendimann) and U.S. Pat. No. 2,826,401 (Peters). The main problem with this injection method is that it is only effective if relatively high pressures are used in the carbonation chamber during carbonation.

A second known method of carbonating water involves spraying or atomizing the water into an atmosphere of carbon dioxide gas. In this method a carbonation chamber may be prefilled with carbon dioxide and the water introduced into the chamber by spraying or the chamber may be partially filled with water and the water drawn upwardly and sprayed into the carbon dioxide atmosphere above the water level in the chamber. In this method, carbon dioxide is dissolved into the water droplets in the spray and the droplets carry the carbon dioxide in dissolved form into the body of water to effect carbonation. Typical examples of this method are shown in U.S. Pat. No. 2,306,714 (Rowell) and U.S. Pat. No. 2,391,003 (Bowman). A major problem with this method is that it requires the carbonation chamber to be pressurized to a relatively high pressure and a long time is required to achieve sufficient carbonation.

A third known method of carbonation, shown in U.S. Pat. No. 4,719,056 (Scott), involves partly filling a carbonation chamber with water and providing an atmosphere of carbon dioxide above the level of water in the chamber and continuously or repeatedly drawing or forcing gas from said atmosphere down into the water by a rotating member such as a paddle wheel which rotates about a horizontal axis at 1,000 to 1,500 RPM and passes through both the carbon dioxide atmosphere and the water. This mechanical mixing increases the area of interface exposure between the carbon dioxide and water; i.e., in comparison to no mixing and causes the water and carbon dioxide to form a solution far more rapidly and to a greater solution concentration than would occur if there were no such mixing of the gas and water. The main disadvantages of this method is that it requires more moving parts, has more chance of malfunction and requires more energy to operate.

It is also known that the carbon dioxide gas solubility rate and dissolved gas concentration level in water increases as the pressure acting upon the liquid gas mix increases.

Finally, within limits, as the temperature of water decreases, the amount of carbon dioxide that can be dissolved into a given volume of water increases. This relationship is shown in Table 10-1 entitled "Solubility of Gases in Water" page 10-4 *Langs Handbook of Chemistry* 12th Edition. This table shows the solubility of carbon dioxide in milliliters per gram of water to be 0.759 ml at 30° C. (72° F.) and 1.646 ml at 1° C. (34° F.) showing 216 percent more carbon dioxide may be dissolved into the water at 1° C. than at 30° C.

The ideal process, therefore, for rapidly carbonating water with maximum levels of dissolved carbon dioxide would provide for:

a means to rapidly generate carbon dioxide a means to cause high interfacial contact between the water and carbon dioxide;

a means to carry out the process at elevated pressure; and a means to carry out the process with water temperatures where the carbon dioxide gas solution level is highest; i.e., a water temperature range of 1° to 5° C.

The present invention satisfies these conditions at low cost and without the use of mechanical mixers or motors as will be explained later in the specification.

OBJECTS OF THE INVENTION

It is a primary object of this invention to provide a simple, inexpensive and efficient process and apparatus for rapidly generating carbon dioxide and carbonating water for use in applications such as a small beverage dispenser.

Another object of this invention is to provide a process and apparatus for rapidly generating carbon dioxide from the mixture of a chemical compound and water and rapidly carbonating water therewith.

Another object of this invention is to provide a process and apparatus for rapidly carbonating water which has a minimum number of moving parts and does not require a pump to circulate or dispense the carbonated water or to pressurize the carbonation tank or a mechanical mixer to increase the interfacial contact between the water and the carbon dioxide.

A still further object of this invention is to provide a process and apparatus for rapidly carbonating water which uses the same carbon dioxide inlet pressure in the carbonation tank both for carbonating the water in the tank and for dispensing the water from the tank.

These and other objects of the invention will become more fully apparent in the following specification and the attached drawings.

SUMMARY OF THE INVENTION

This invention is a high speed process and apparatus for carbonating water by providing a first pressure vessel and a second pressure vessel, operatively connecting the interiors of the first and second pressure vessel to each other with a gas conducting means, positioning a selected quantity of a carbon dioxide generating compound at a first location within the first pressure vessel, positioning a selected quantity of water at a second location within the first pressure vessel, filling the second pressure vessel to a selected level with a larger quantity of water than that in the first pressure vessel, releasing the contained quantity of water into the carbon dioxide generating compound in the first pressure vessel to chemically react with the compound and generate pressurized carbon dioxide gas therein with sufficient pressure to pass into the second pressure vessel and carbonate the water therein, the selected level of the water in the first and second pressure vessels being such that the combined head space remaining within both the pressure vessels is at least 5% of the total combined volume of both said pressure vessels, and providing a means to remove carbonated water from the second pressure vessel upon demand.

DESCRIPTION OF THE PREFERRED EMBODIMENTS

Figure 1:
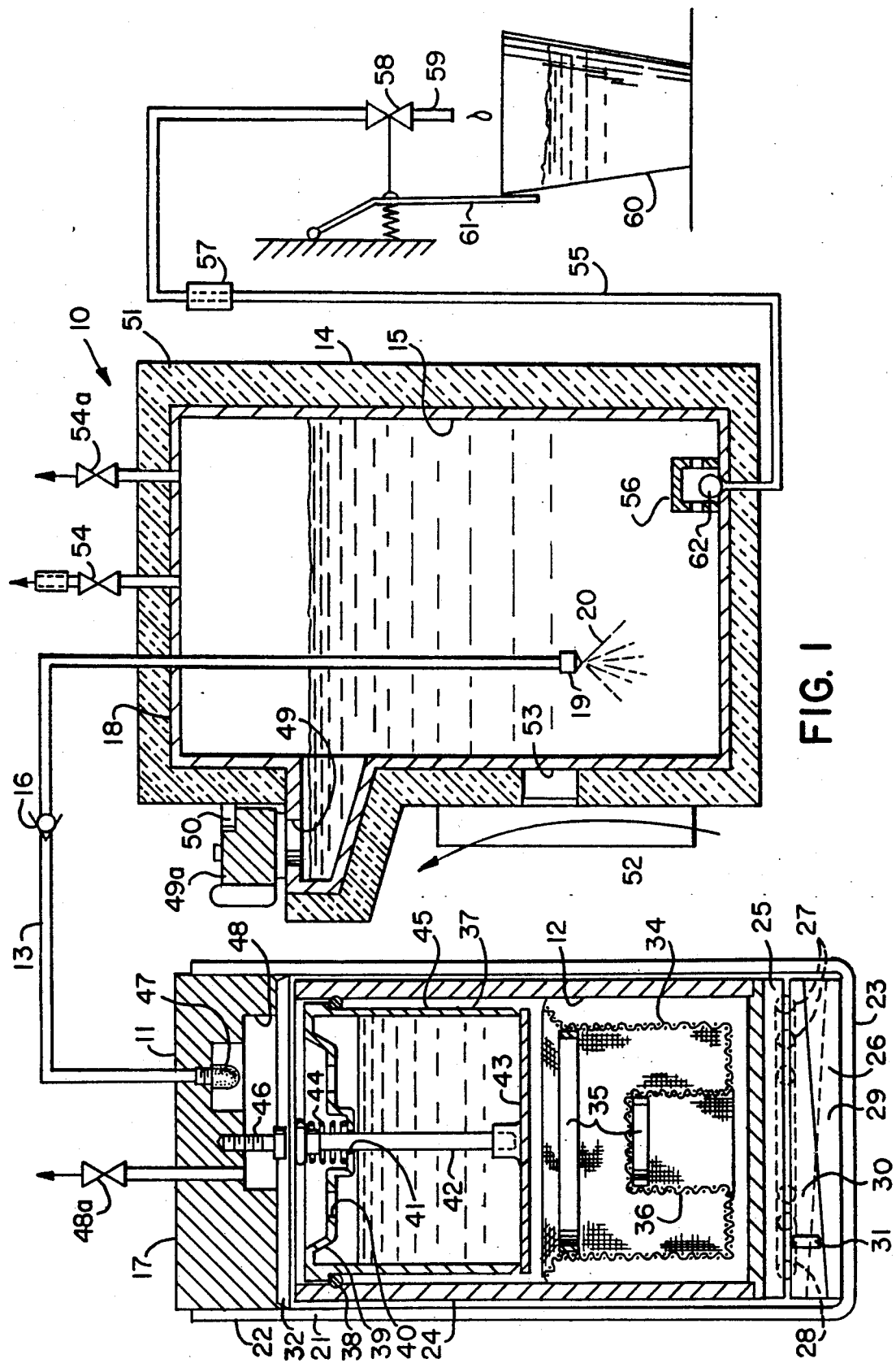
FIG. 1 is a diagrammatic view showing the apparatus of one embodiment of the invention.

Referring now to the drawings and in particular to FIG. 1, a carbonation system for carrying out the present invention is generally designated by the numeral 10. Two important components of the system are a carbon dioxide generating tank 11 having a carbon dioxide generating chamber 12 operatively connected by a gas conducting tube 13 to a carbonation tank 14 having a carbonation chamber 15. Both the tanks 11 and 14 are pressure vessels which are designed to withstand the amount of pressure to be used in the carbon dioxide generation and carbonation processes and for dispensing the carbonated liquid.

A check valve 16 is provided in the tube 13 to prevent a back-up of carbon dioxide or water from the carbonation tank 14 into the carbon dioxide generating tank 11. The carbon dioxide supply tube 13 extends from inside the top 17 of the tank 11, through the top 18 of the tank 14 and vertically downwardly into the tank a sufficient distance so that its lower end is below the water level when the tank 14 is filled with water to its usual level for carbonation. An injector spray nozzle 19 is operatively attached to the lower end of the tube 13 to provide a diverging spray 20 of carbon dioxide into the water to effect carbonation of the water. The nozzle 19 is preferably located about ⅔ of the distance down from the top 18 of the tank 14.

Figure 2:
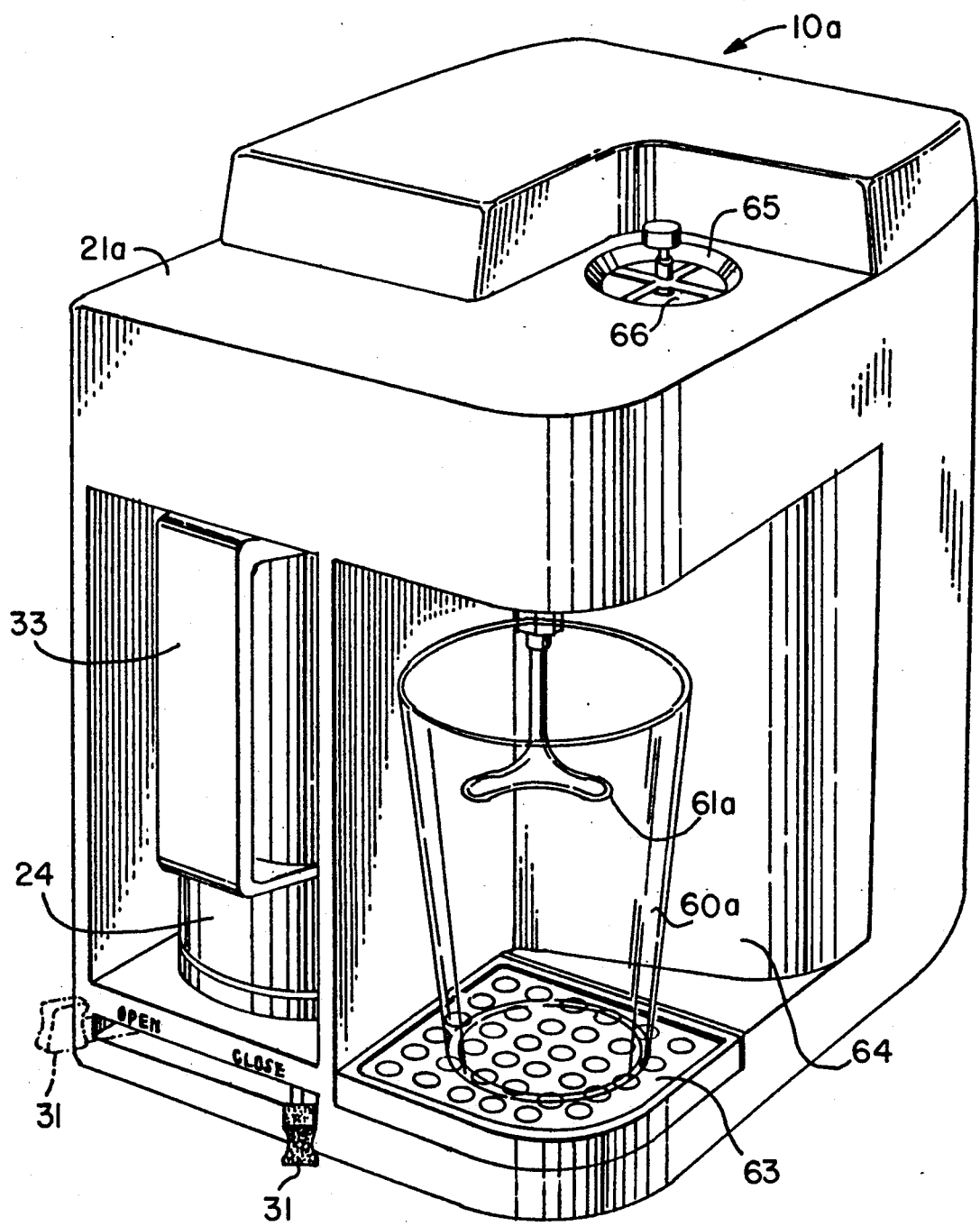
FIG. 2 is a perspective view of the invention showing a typical cabinet or housing containing a modification of the apparatus shown in FIG. 1.
Figure 3:
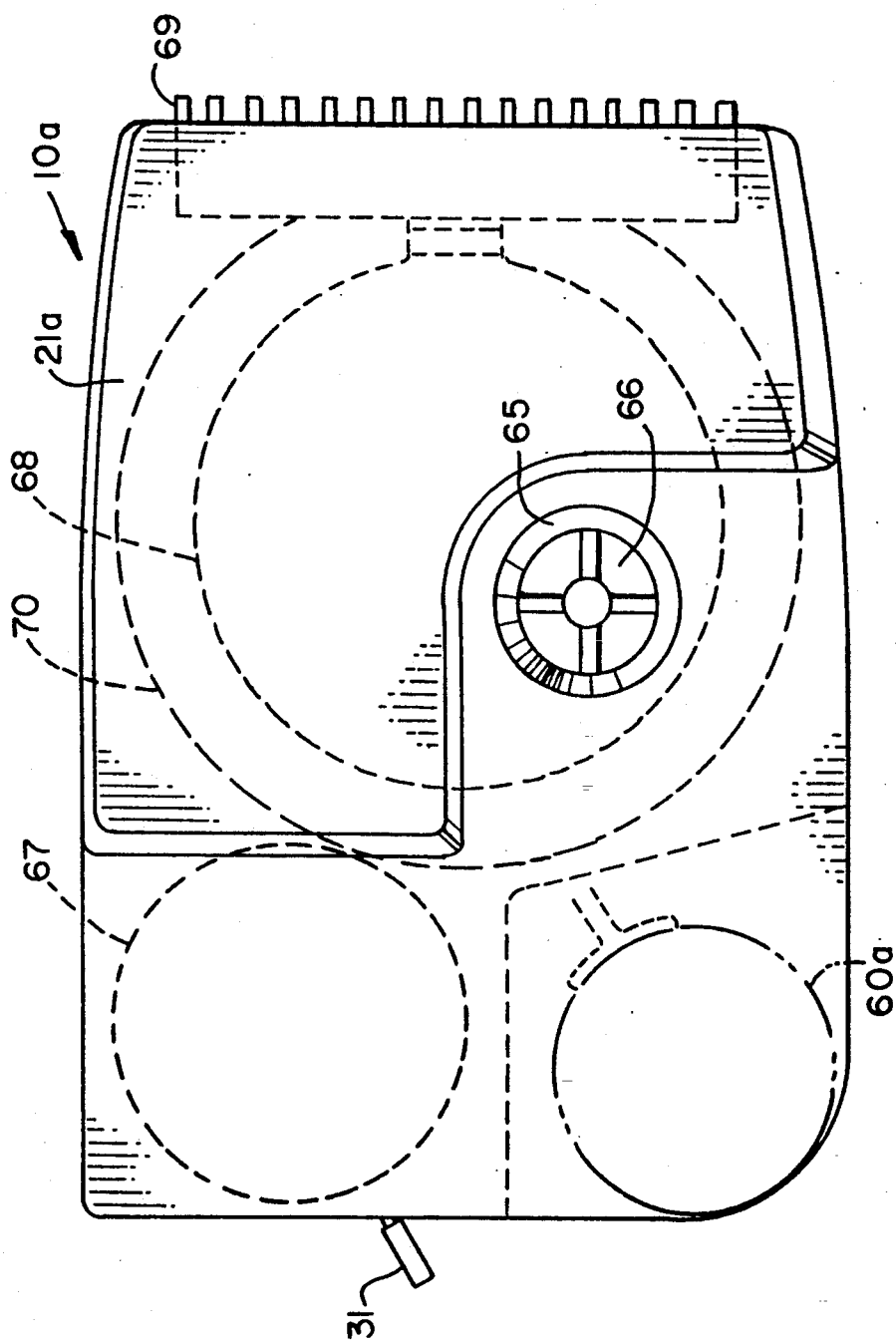
FIG. 3 is a top plan view of the device shown in FIG. 2 showing the internal location of the main components of the invention.
Figure 4:
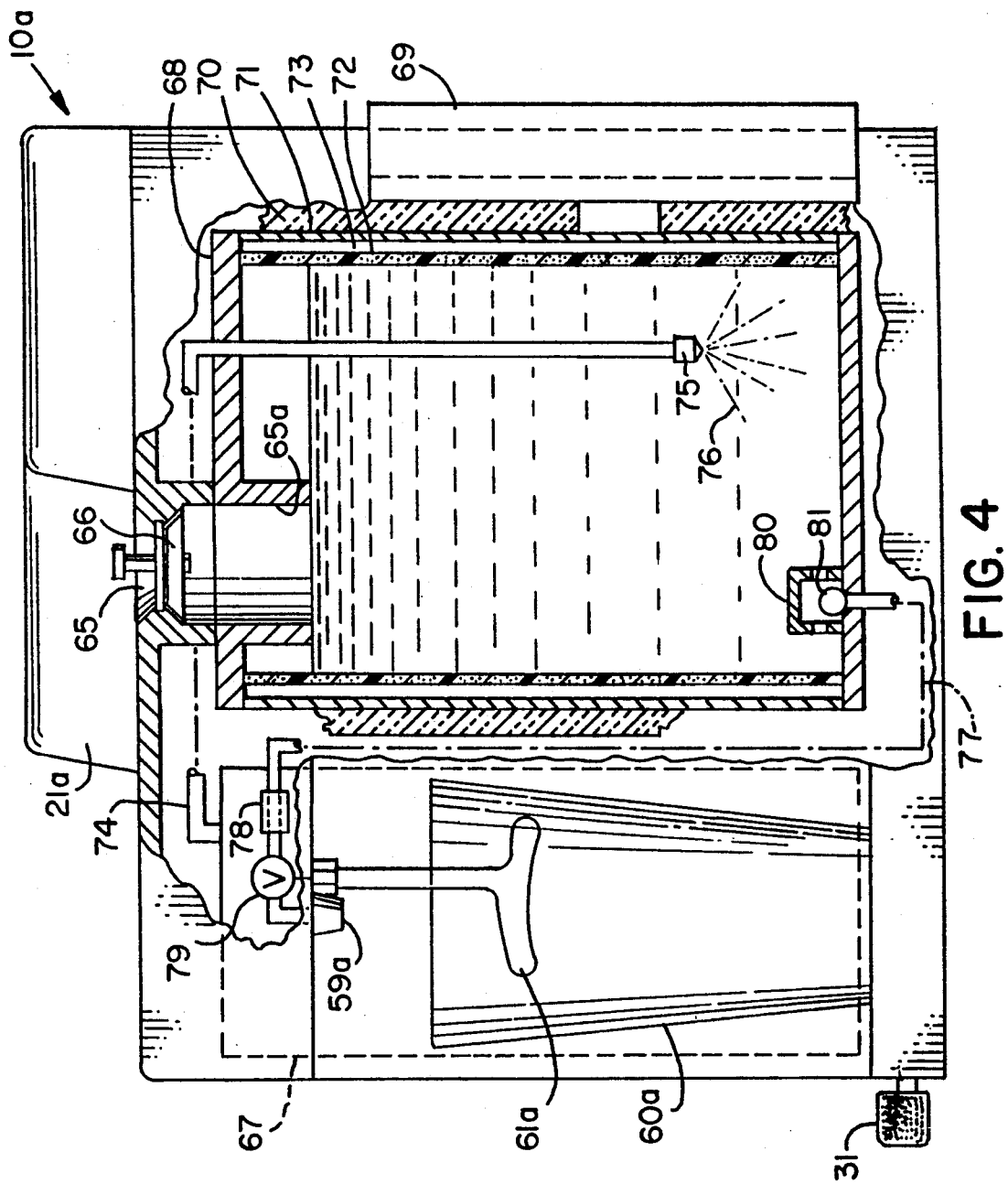
FIG. 4 is a side elevational view of the device shown in FIGS. 2 and 3 with portions broken away to shown part of the interior of some of the main working components of the invention.

The apparatus 10 in FIG. 1 is mounted in a cabinet or housing 21 (shown only in part in FIG. 1) similar to the cabinet 21a shown in FIGS. 2 through 4. The primary difference between the cabinet for the apparatus of FIG. 1 and the cabinet for the apparatus of FIG. 4 is the location and type of inlet port and closure for the carbonation tank shown in these two different figures which will be described later.

The top 17 of the carbon dioxide generating tank 11 is attached to an upper portion 22 of the cabinet 21 which retains the top 17 in a fixed location above a base portion 23 of the cabinet 21.

A removeable cylindrical bottom portion or tank body 24 of the tank 11 is positioned a short distance below the top 17 when the tank 11 is not being used to generate carbon dioxide or for charging the carbonation tank 14 and sits on a lift platform 25 which is moveable up and down by a rotary cam mechanism 26 which supports the lift platform 25 on bearings 27 in a bearing race 28. The cam mechanism 26 has a fixed lower portion 29 and a rotatable upper portion 30 which is moved by a radially outwardly extending cam handle 31. When the handle 31 is moved to the right the cam 26 raises the platform 25 and lifts the tank body 24 up to seal against the top 17 and form a pressure vessel which is sealed to the outside atmosphere. The cam 26 is a self locking type so that when the body 24 is raised to a sealing position with the top 17 it will not move downward under load and it is extremely difficult to open the cam unless the chamber pressure is low for example in the range of between 10-15 psi, (0.703-1.055 kg/cm$^2$). This provides a safety feature for the user so that the chamber 12 cannot be inadvertently opened while there is high internal pressure therein The removeable tank body 24 is prefereably provided with a handle 33 as shown in FIG. 2 to facilitate the removal of the body 24 from its normal position beneath the top 17 and for handling the tank body while it is being emptied or filled.

An annular seal ring (not shown) may be mounted on either the top 17 or the tank body 24 to create an air tight seal between the tank body 24 and the top 17 when the body 24 is in the raised position. A tapered lip 32 extends downwardly around the outer edge of the top 17 at the bottom thereof to guide the body 24 into a centered position with respect to the top 17 when it is raised to seal against the top.

A porous screen basket 34 is positioned in the lower portion of the tank body 24 for retaining a carbon dioxide generating compound such as sodium bicarbonate and citric acid which may be either in the form of a powder or pellets. The basket 34 is reinforced by a number of circular hoops 35 extending circumferentially around it at needed locations. The basket has an upwardly extending hollow center column 36 to cause more rapid water penetration into the carbon dioxide generating compound placed in the basket 34.

Figure 7:
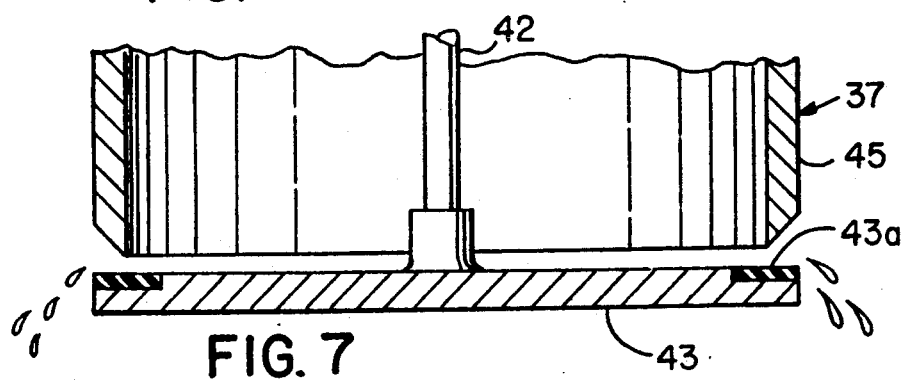
FIG. 7 is an enlarged fragmentary cross sectional view of the water container in the carbon dioxide generation chamber in FIG. 1 with the bottom of the container lowered to release the water.

A removeable cylindrical water container 37 is positioned in the upper portion of the body 24 above the basket 34 and is sealed around its circumference near the top by a seal ring to prevent water from passing between the body 24 and the container 37. The container 37 has a top 39 with water inlet holes 40 and a center hole 41 through which passes a center pin 42 to which is attached a bottom 43 of the container 37. A spring 44 biases the pin 42 upwardly to hold the bottom 43 closed in sealing relationship to the lower edge of the sidewall 45 of the container 37 and thereby retain water placed therein until the body member 24 is moved to the raised or sealing position against the top 17. An elastomeric seal ring 43a is positioned around the top surface of the container bottom 43 as shown in FIG. 7 to create a watertight seal between the bottom 43 and the container sidewall 45. Moving the body 24 to the raised position brings the upper end of the center pin 42 into contact with a stop screw 46 extending downwardly from the center of the top 17. Once the pin 41 contacts the stop screw 46 it stops its upward movement and holds the bottom 43 in a fixed position while the rest of the container 37 moves upwardly with the body 24. This creates an opening between the bottom 43 and the sidewall 45 of the container 37 thereby releasing any water in the container 34 as shown in FIG. 7 to flow onto the carbon dioxide generating compound in the basket 34 and produce a chemical reaction which generates pressurized carbon dioxide within the chamber 12.

A porous air filter 47 is located in a cavity 48 in the top 17 and is connected to the inlet end of the gas conducting tube 13 to prevent any foam from the chemical reaction from passing through the line 13 while permitting carbon dioxide to flow through the line 13 to the carbonation tank 14.

A pressure relief valve 48a is mounted in the top 17 to vent excess pressure from the tank 11 and prevent unsafe overpressurization of the tank. The preferred range of operating pressure of the tank 11 is in the range of 50 to 200 psi, (3.516 to 14.062 kg/cm$^2$).

Referring again to the carbonation tank 14, a water inlet port 49 is provided for filling the tank to a desired level below the top 18 thereby providing head space within the tank. The port 49 can be sealed with a pivoted closure lid 49a which can be swung into a closed position beneath a retaining cam 50 and against an elastomeric seal (not shown). Once closed and under internal pressure the lid cannot be easily opened. This provides a safety factor to the user. In order to maximize the amount of carbon dioxide which is held in solution within the tank 14, the pressure setting is in the range of approximately 100-300 psi (7.031-21.093 kg/cm$^2$). An alternative closure shown in FIGS. 2 through 6 and described later can also be used with this embodiment.

The tank 14 is enclosed in a layer of insulation 51 such as urethane foam to aid in maintaining the water at a cool temperature of about 34°-38° F., (1°-3° C.) in conjunction with a thermoelectric cooling module 52 which is affixed the tank wall 53.

A restrictive venting valve 54 is mounted in communication with the head space of the tank 14 to restrictively vent carbon dioxide from the tank to speed up the flow of carbon dioxide through the water and provide more rapid carbonation. This restrictive venting maintains an internal head pressure in the range of 40 to 200 psi, (2.81 to 14.06 kg/cm$^2$).

A safety pressure relief valve 54a is also mounted in communication with the head space of the carbonation tank 14 to release excess pressure of more than 300 psi, (21.093 kg/cm$^2$).

A carbonated water dispensing tube 55 extends from a floating ball check valve 56 at the bottom of the tank 14 in order to permit withdrawal of substantially all the carbonated water in the tank. The water dispensing tube 55 extends from the tank 14 through a restrictor 57 which slows the rate of pressure drop in the tube 55 and thereby prevents dissolved carbon dioxide from coming out of solution in the water when it is dispensed. The outlet end of the dispensing tube 55 is connected to a dispensing valve 58 which turns off and on the flow of carbonated water as needed. When released by he valve 58 the carbonated water then flows through an outlet spout 59 into a drinking receptacle 60 where it may be mixed with flavoring concentrate.

Placing the drinking receptacle 60 against a valve control lever 61 opens the valve 58 to dispense carbonated water from the tank 14.

The floating ball-check valve 56 stops the flow of water into the dispense tube 55 when the liquid level in the chamber 15 is insufficient to float the ball 62. This prevents gas from flowing into the water dispense line 55 when the water is too low in the tank 14.

In operation, to prepare a batch of carbonated water with the carbonation apparatus 10, the cam handle 31 is moved to the left or "open" position and the tank body 24 is removed from its operating position on the lift platform 25 and the water container 37 is removed from the tank body 24. Any residue of water from the previous carbonation operation is then dumped from the body 24. The screen basket 34 is filled with carbon dioxide generating chemicals either in the form of powder or in pellet form.

As previously mentioned, in order to achieve rapid chemical reaction between the compound and the water and rapid generation of carbon dioxide the exposed surface area in sq. cm. divided by volume in cu. cm. of the carbonating compound must be a ratio of about 0.86 or more. The higher the exposed surface area is as a ratio of the carbon dioxide compound, the faster the reaction will be when the compound is submerged in water. This increase in exposed surface area can be achieved by selecting a size of pellet or particle of the compound which will not compact when put in the basket 34 but will leave interstices between the pellets or particles for more rapid penetration of the water. Also by providing a basket shape such as the basket 34 with an open center column 36, which results in an annular cross section in the lower portion of the basket 34, this configuration will further aid in rapid water penetration to all parts of the compound.

Other shapes of baskets such as those with convoluted side walls will also provide increased exposed surface area of the compound for a more rapid reaction with the water.

After the basket 34 has been filled with compound, the water container 37 is placed in the upper portion of the tank body 24 above the basket 34. The container bottom 43 is held closed in the sealed position to retain water. Water is then poured through the holes 40 in the top 39 to fill the container 37.

The tank body 24 is then placed back in its operative position in the cabinet 21a on top of the lift platform 25 and is ready to be raised to the "closed" position as soon as the carbonation tank 14 is filled with water and ready to receive carbon dioxide.

The closure lid 49a on the carbonation tank 14 is opened and the tank is filled with water to the desired level near the inlet port 49, leaving a head space which serves as a gas accumulator for a more even dispense pressure for the carbonated water. The closure lid 49a is then swung into the closed position and locked in place by the retaining cam 50 to seal the carbonation tank 14 to the outside atmosphere. For most effective operation, the combined head space within both chambers or pressure vessels should be at least 5% of the total combined volume of both said vessels.

The cam lever 31 is moved to the right or "close" position, thereby raising the tank body 24 to seal against the top 17 and form the carbonation chamber 12 which is closed to the outside atmosphere. As the tank body 24 seals against the top 17, the top of the pin 42 contacts the stop screw 46 in the top 17 which stops the upward movement of the container bottom 43 while the sidewall 45 of the container 37 continues to move upwardly a short distance thereby releasing the water in the container as shown in FIG. 7 to saturate the carbon generating compound in the basket 34 and cause the chemical reaction which generates carbon dioxide within the chamber 12.

As the gas is generated in the chamber 12 it flows through the filter 47 and the tube 13 and out of the nozzle 19 beneath the water in the carbonation chamber 15 to carbonate the water and generate sufficient pressure in the head space of the chamber 15 to prevent the carbon dioxide from coming out of solution in the water and for dispensing the water through the tube 55 when a drinking receptacle 60 is placed against the dispense lever 61 to open the valve 58 and permit the water to flow from the spout 59. The restrictor 57 limits the rate of pressure drop as the carbonated water flows from the pressurized carbonation chamber 15 and provides a uniform flow of water from the spout 59 when the valve 58 is opened. The pressure relief valve 54a prevents the build up in the tank 14 of an unsafe operating pressure beyond that needed to carbonate and dispense the water. The ball check-valve 56 prevents carbon dioxide gas from flowing through the tube 55 when the water level is near the bottom of the tank 14. When the water in the tank 14 is used up and a new batch is needed, the above described process is repeated.

Referring now again in more detail to the embodiment shown in FIG. 2, similar numerals are used to indicate similar parts of the embodiment of FIG. 1. The apparatus 10a is enclosed in a cabinet or housing 21a and has the carbon dioxide generating tank body 24 positioned in the cabinet 21a as previously described. The body 24 is moved to the open and close position with the lever 31. A drinking glass or receptacle 60a is positioned on a drip tray 63 in an inwardly extending offset 64 having a dispense lever 61a and a dispense spout 59a shown later in FIG. 4. The apparatus of 10a also has an alternative inlet port 65 and closure lid 66 to the port 49 and lid 49a shown in FIG. 1.

The carbonation apparatus 10a shown in FIG. 2 is further shown in a top plan view in FIG. 3 which shows the inlet port 65 and closure lid 66 as well as the location of a carbon dioxide generation tank 67 (similar to the tank 11 in FIG. 1), a carbonation tank 68, a cooling module 69 in communication with the tank 67 and a drinking receptacle 60a. A layer of insulation 70 encloses the tank 68.

FIG. 4 shows a modification of the embodiment shown in FIG. 1 in which the inlet port 65 and closure lid 66 are the same type as that shown in FIGS. 2 through 6. The inlet port 65 has a downward extension 65a to limit the water level in the tank 68 and thereby provide head space at the top of the tank 68.

The carbonation tank 68 shown in FIGS. 3 and 4 differs from the tank 14 in FIG. 1 since in addition to a cylindrical sidewall 71 it contains and inner wall 72 spaced from the sidewall to form an annular space 73 therebetween. The inner wall 72 is pervious to carbon dioxide gas but impervious to water so that when water is poured into the inlet port 65 it will remain inside the inner wall 72 thereby leaving the annular space 73 open to receive carbon dioxide gas which can pass in either direction through the wall 72.

This double wall construction reduces the amount of time required for solvation of the carbon dioxide gas in the water as will be explained later.

Except for a different type of inlet closure lid and the double wall construction, the apparatus for FIG. 4 is quite similar to that shown in FIG. 1. Carbon dioxide generating tank 67 is the same as the tank 17 in FIG. 1 and operates in the same manner.

A gas conducting tube 74 similiar to the tube 13 in FIG. 1 extends through the top of the tank 68 and terminates in a nozzle 75 to spray a diverging spray 76 of carbon dioxide beneath the water in the tank 68. A water dispense tube 77 extends from the bottom of the tank 68 through a restrictor 78 then through a valve 79 to the spout 59a. The valve is operated by the dispense lever 61a when contacted by the drinking receptacle 60a.

The inlet end of the dispense tube 77 is has a ball-check valve 80 similar to the valve 56 in FIG. 1 to prevent gas from flowing though the dispense line 77 when the water is too low in the tank to float a ball 81. One or both of the tanks 67 and 68 may be equipped with a pressure relief valve (not shown) similar to the valve 54 in FIG. 1.

Figure 5:
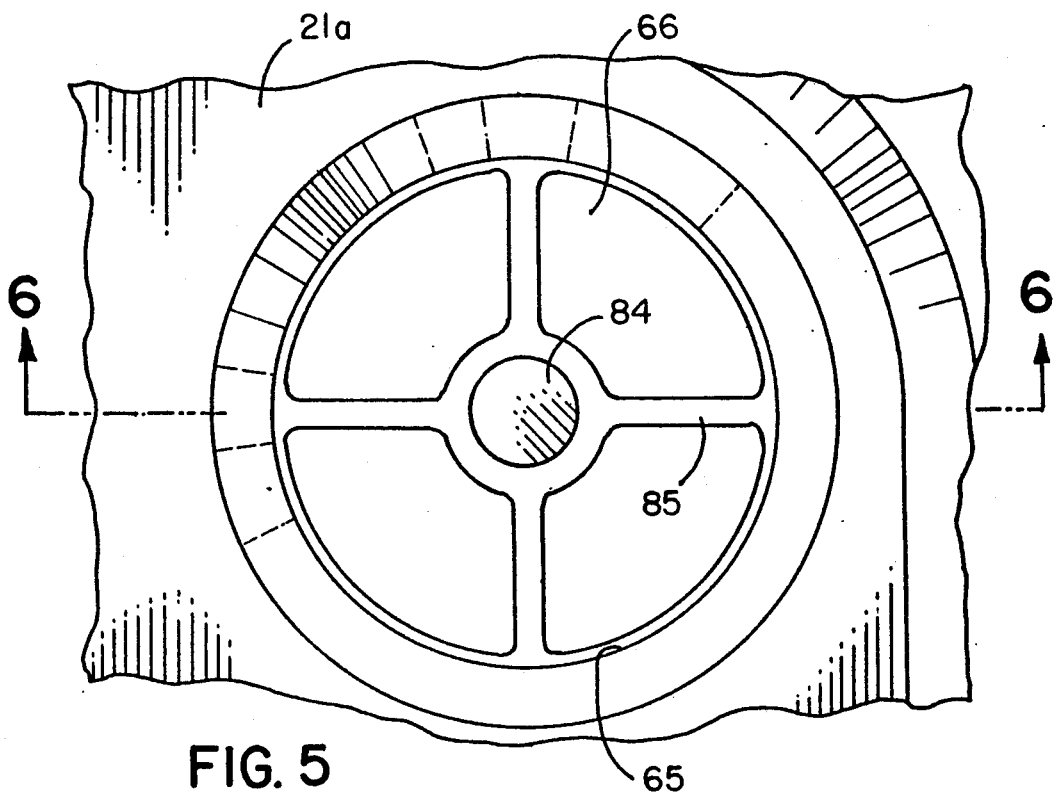
FIG. 5 is an enlarged top plan view of the inlet port and closure of the device shown in FIGS. 2 through 5.
Figure 6:
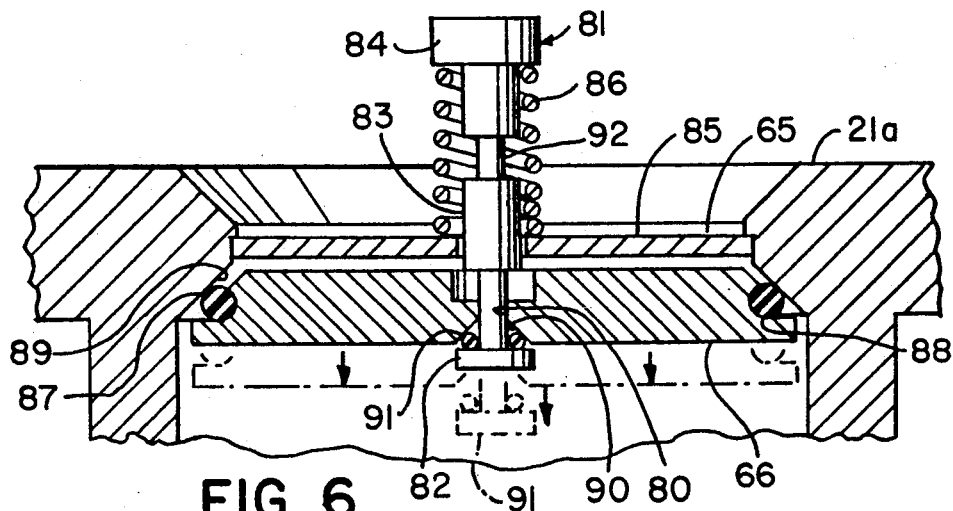
FIG. 6 is an enlarged cross-sectional view of the inlet port and closure shown in FIG. 5.

FIGS. 5 and 6 show the inlet port 65 and the closure lid 66 in greater detail. The lid 66 has a center hole 80 through which passes a stem member 81 having a bottom end cap 82, an enlarged center segment 83, and a top end cap 84. The stem passes through a spider member 85 which is attached to the inside circumference of the inlet port 65. A Spring 86 surrounds the upper portion of the stem 81 with one end bearing against the spider member 85 and the other end bearing against the top end cap 84. The spring 86, biases the stem 81 upward thereby pulling the lid 66 upward so that a seal ring 87 in a circumferential groove 88 on the lid 66 seals against an opposed downwardly inclined surface 89 of the inlet port 65. The center hole 80 is enlarged at the bottom to provide a second inclined sealing surface 90 to be contacted by a seal ring 91 carried on the stem 81 and resting on the bottom end cap 82. The seal ring 91 and stem 81 serves as a pressure release valve which requires less force to open than the lid 66 when there is internal pressure within the tank 68. The upward bias of the spring 86 also pulls the seal ring 91 into sealing contact with the surface 90. With both seal rings 87 and 91 in sealing contact respectively with surfaces 89 and 90, the tank 68 is sealed to the outside atmosphere and will retain pressurized carbon dioxide and carbonated water when generated by a chemical reaction in the generating tank 67 or when pressurized carbon dioxide is injected into the tank 67 from an existing source of pressurized carbon dioxide. The internal pressure within the tank 67 will force the seal rings 87 and 91 tighter against the sealing surfaces 89 and 90 for an even more positive seal.

When the carbonated water in the tank 68 has been used up, The pressure within the tank 68 can be released by pressing down on the top end cap 84 which in turn breaks the seal at the seal ring 91 allowing the internal pressure to escape through the center hole 80 in the lid 66. By pressing down even further the lid 66 drops away as shown in the chain dotted line in FIG. 6 so that the seal ring 87 no longer seals against the surface 89. With the lid open, the tank 68 can be refilled with water for the next batch to be carbonated. It should be understood that the lid 66 is not removed from the inlet port 65 but is merely moved downwardly enough to provide an opening for filling the tank 68 with water. The lid 66 is held open for filling the tank 68 by pressing down on the stem 81 until an annular recess 92 on the stem 81 is aligned with the spider member 85, then moving the stem 81 laterally so that the recess 92 catches on the spider member 85 and holds the stem 81 and the lid 66 in the down or open position To close the lid 66 the stem 81 is moved laterally in the opposite direction to disengage the recess 92 from the spider member 85. The spring 86 then forces the stem 81 and the lid 66 upwardly into the closed or sealing position.

The operation of the carbon dioxide generating tank 67 in FIG. 4 is identical to that of the tank 11 in FIG. 1 so this will not be repeated. The operation within the carbonation tank 68 is the same as within the carbonation tank 14 in FIG. 1 except that the tank 68 has the inner wall 72 as previously described which retains water, but which is permeable to carbon dioxide gas. During the carbonation process when carbon dioxide is being injected into the tank 68 most but not all of the carbon dioxide is dissolved in the dynamic injection process. Some of the carbon dioxide solvation occurs by stationary surface absorbtion, i.e., water surface in contact with carbon dioxide gas. The double wall construction of the tank 68 increases the surface area contact between the gas and the water, since the carbon dioxide gas which passes from the water to the head space of the tank and through the inner wall 72 into the annular space 73 remains exposed to the surface of the water and can be dissolved into the water from both the head space and from the annular space 73.

This rapid solvation of the carbon dioxide gas in the water when combined with the rapid generation of carbon dioxide in the generating tank 67 as previously described, results in the entire process being completed in a very short period of time of 5 minutes or less.

As another alternative embodiment, the carbonation tank 68 can be connected through the tube 74 to a tank of pressurized carbon dioxide rather than to the carbon dioxide gas generating tank 67 in FIG. 4. This can result in an even faster carbontation period since no time is required for the generation of the carbon dioxide gas.

It will also be recognized that these and various other modifications can me made in the embodiments shown and described herein without departing from the scope of the invention.

We claim:

1. A high speed process for carbonating water comprising the steps of:
    (A) providing a first pressure vessel having an upper portion and a lower portion temporarily separated therefrom;
    (B) providing a second pressure vessel;
    (C) operatively connecting the interiors of the first and second pressure vessel to each other with a gas conducting means;
    (D) positioning a selected quantity of a carbon dioxide generating compound at a first location within the lower portion of the first pressure vessel at the bottom thereof;
    (E) positioning a contained selected quantity of water in a container at a second location within the first pressure vessel above and out of contact with the carbon dioxide generating compound;
    (F) filling the second pressure vessel to a selected level with a larger quantity of water than that in the first pressure vessel;
    (G) sealing the second pressure vessel from the outside atmosphere;
    (H) sealing the first pressure vessel from the outside atmosphere by moving the lower portion of the first pressure vessel into sealing contact with the upper portion thereof;

(I) releasing the contained quantity of water from the container into the carbon dioxide generating compound in the first pressure vessel to chemically react with the carbon dioxide generating compound and generate pressurized carbon dioxide gas therein with sufficient pressure to pass into the second pressure vessel and carbonate the water therein;

(J) the selected level of the water in the first and second pressure vessels being such that the combined head space remaining within both the pressure vessels is at least 5% of the total combined volume of both said pressure vessels, and (K) providing a means to remove carbonated water from the second pressure vessel upon demand.

2. The process as claimed in claim 1 including the step of filtering the carbon dioxide generated pressurized flowing from the first pressure vessel tot he second vessel to prevent any liquid from the chemical reaction in the first pressure vessel from passing into the second pressure vessel.

3. The process as claimed in claim 1 including the step of providing a means for removably attaching the first and second pressure vessel to each other so that the first pressure vessel can be detached for cleaning and adding water thereto.

4. The process as claimed in claim 1 wherein the steps of sealing of the first pressure vessel tot he outside atmosphere and releasing the water into contact with the carbon dioxide producing compound are carried out substantially simultaneously.

5. An apparatus for rapidly carbonating water comprising:
(A) a first pressure vessel having a fixed upper portion and a lower portion moveable toward and from a position of sealing contact with the upper portion, said first pressure vessel defining a gas generation chamber in the interior thereof when the upper and lower portions are in sealing contact with each other, said first pressure vessel including sealable access means at the top of the lower portion in communication with the gas generation chamber to position a carbon dioxide generating compound in the bottom of the gas generation chamber and to permit the insertion of a container of water therein above and out of contact with said carbon dioxide generating compound;
(B) means for moving the lower portion of the first pressure vessel into sealing contact with the upper portion thereof, thereby sealing the gas generation chamber;
(C) means within the first pressure vessel to release the water from the container into the carbon dioxide generating compound within the gas generation chamber when the gas generation chamber has been sealed to chemically react with the water and generate pressurized carbon dioxide;
(D) a second pressure vessel having a top wall, bottom wall and sidewall means defining a carbonation chamber in the interior thereof for containing water to be carbonated;
(E) a gas supply line operatively connecting the gas generation chamber with the carbonation chamber to permit generated pressurized carbon dioxide gas to flow from the gas generation chamber to the carbonation chamber and carbonate the water therein;
(F) said second pressure vessel including;
(1) sealable access means in the top wall in communication with the carbonation chamber to permit the insertion of water into said carbonation chamber to at least partially fill the carbonation chamber, and
(2) liquid outlet dispensing means for obtaining carbonated water from the carbonation chamber upon demand.

6. The apparatus claimed in claim 5 including a filter means operatively associated with the gas supply line.

7. The apparatus claimed in claim 5 wherein the sealable means in the second pressure vessel comprises:
(a) an inlet port in the top wall of the second pressure vessel having a circumferential sealing surface facing inwardly into the carbonation chamber;
(b) a lid of a shape and size to close the inlet port, said lid having an outwardly facing surface with a seal means around its circumference to seal against the inwardly facing surface of the inlet port when the lid is in the closed position;
(c) a lid retaining member extending across the inlet port and holding the lid in alignment with the inlet port for limited movement between an open position inside the carbonation chamber and a closed position boaring against the inwardly facing surface of the inlet port;
(d) a pressure release member extending through the lid and moveable between a sealed and non-sealed position with respect to the lid; and
(e) means biasing both the lid and the pressure release member into a closed sealing position.

8. A high speed carbonation machine for carbonating water comprising:
(A) a housing;
(B) a first pressure vessel defining a gas generation chamber, said first pressure vessel having;
(1) an upper vessel portion fixedly attached to the housing of the carbonation machine,
(2) a removable lower vessel portion for receiving water and a carbon dioxide forming compound therein positioned below the upper vessel portion,
(3) moveable platform means mounted on the housing a spaced distance below the upper vessel portion and directly beneath the lower vessel portion to move the lower vessel portion upward against the upper vessel portion and retaining the lower portion in sealing engagement therewith,
(4) the lower vessel portion having a space at the bottom thereof for containing a carbon dioxide producing compound in a first location,
(5) a removable water container within the lower vessel portion which temporarily contains a quantity of water at a second location above the carbon dioxide producing compound, and
(6) release means on the water container which engages the upper vessel portion and releases the water into the carbon dioxide forming compound when the lower vessel portion is moved into sealing contact with the upper vessel portion;
(C) a second pressure vessel enclosed by the housing defining a carbonation chamber; and
(D) a gas conducting line operatively connecting the gas generation chamber through the upper vessel portion with the carbonation chamber to permit generated carbon dioxide gas to flow from the gas generation chamber to the carbonation chamber;
(E) said second pressure vessel including;
  (1) sealable access means in communication with the carbonation chamber to permit the insertion of water into said carbonation chamber, and
  (2) liquid outlet dispensing means for obtaining carbonated water from the carbonation chamber upon demand.

9. The apparatus claimed in claim 8 wherein the moveable platform means is a rotary cam actuated platform which is rotatable about a vertical axis and movable up and down in response to its relative rotated position with respect to the cam.

* * * * *